Figure 1:
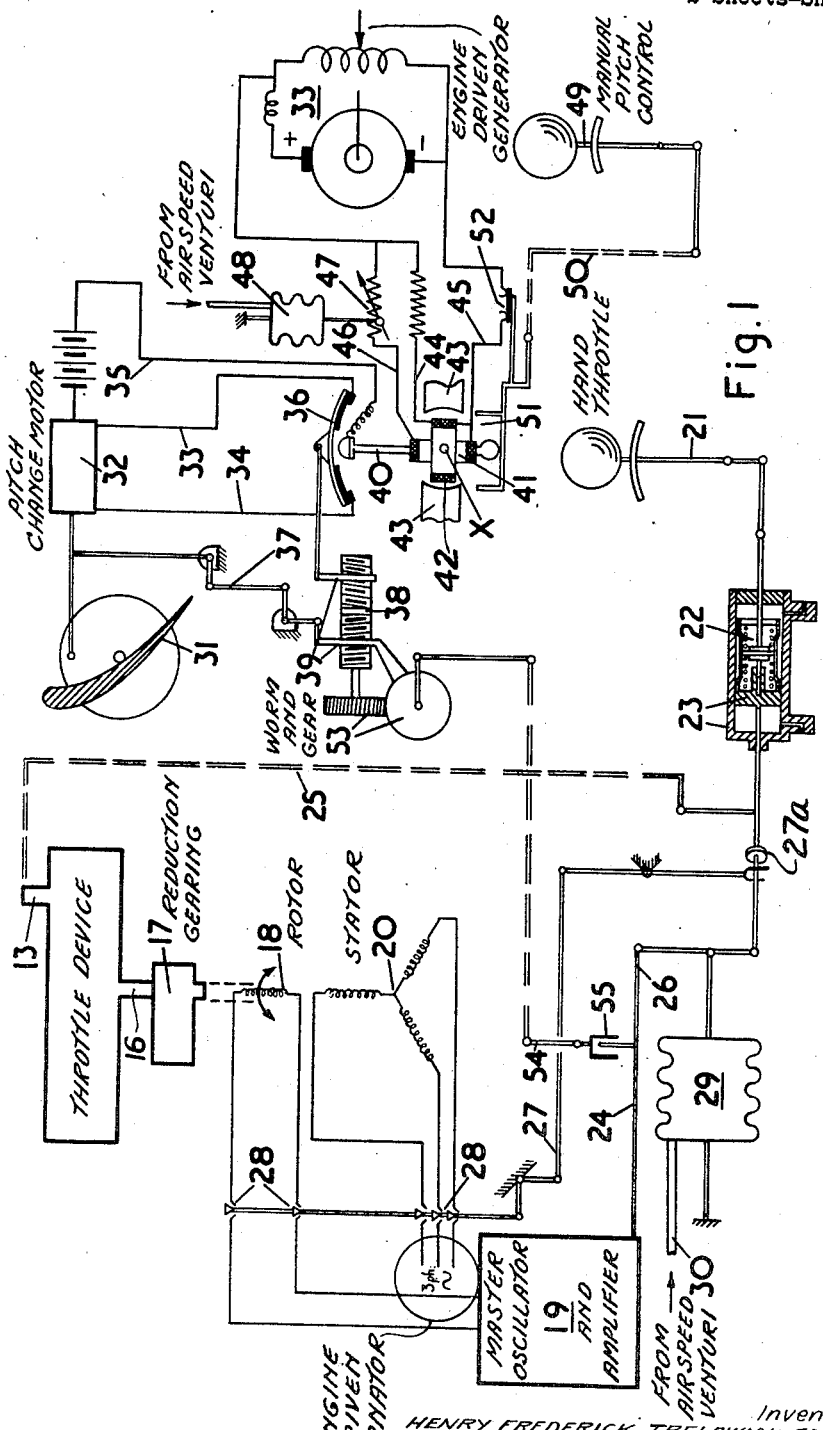

May 8, 1951        H. F. T. ADAMS        2,552,131
AIRCRAFT SPEED GOVERNOR MEANS

Filed March 28, 1946        2 Sheets-Sheet 1

Inventor
HENRY FREDERICK TRELAWNY ADAMS,
by Robert B Larson Attorney

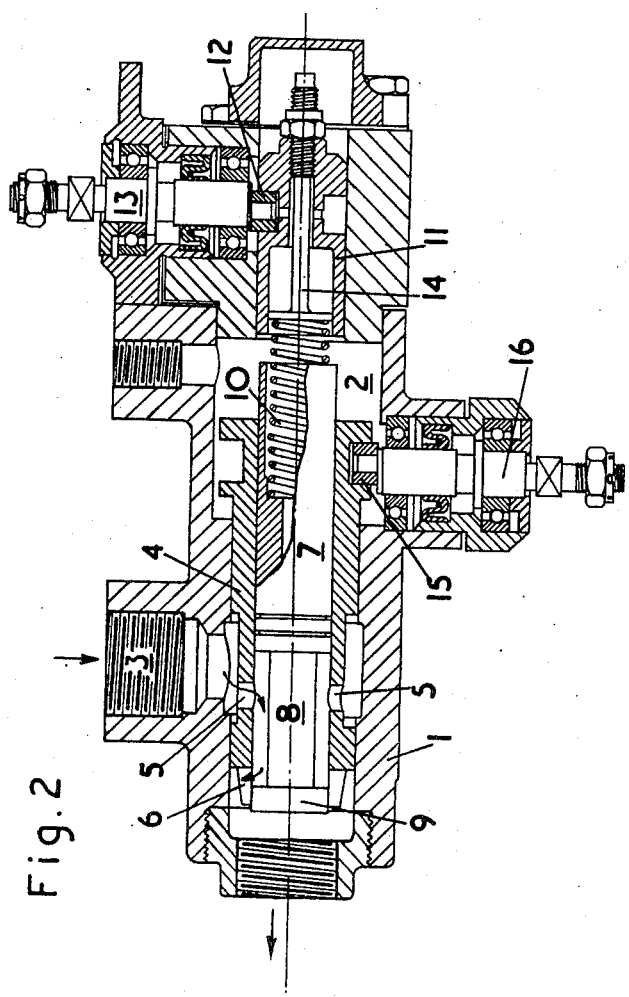

Patented May 8, 1951

2,552,131

UNITED STATES PATENT OFFICE 2,552,131

AIRCRAFT SPEED GOVERNOR MEANS

Henry Frederick Trelawney Adams, Lower Stondon, Henlow, England, assignor to Power Jets (Research & Development) Limited, London, England Application March 28, 1946, Serial No. 657,850
In Great Britain March 28, 1945

12 Claims. (Cl. 170—135.74)

This invention relates to an aircraft speed control system and has for its object, in general, to provide a governing or controlling system capable of maintaining aircraft speed constant with a high degree of accuracy and reliability. Additionally the invention deals with the problem of maintaining the optimum angle of attack of the blades of an aircraft propelling screw.

According to the invention there is provided an aircraft speed control system, comprising means for supplying alternating electric current of a variable frequency determined by the engine speed, means for supplying alternating electric current of a standard frequency and for selectively setting such standard frequency, means comparing and responding to a difference between said frequencies to effect an adjustment of engine speed in a sense that will restore the variable frequency to the value of the standard frequency, and means for modifying the setting of said standard frequency in accordance with departures from a selected air speed.

In a preferred form of the invention the system includes operator-controlled means by which the standard frequency can be selectively set to produce a variation in engine speed, said operator-controlled means comprising a mechanical linkage the action of which is modified by the air speed-sensitive means to vary the effective frequency adjustment in accordance with air speed.

According to a further feature of the invention when the adjustment of engine speed is effected through control of its fuel supply, the comparing and responding means includes a first fuel control valve element which is adapted to be selectively set to determine a datum value of the fuel flow and a second adjustable control valve element whose adjustment is dependent upon the existence of the frequency difference referred to and which co-operates with said first valve element to adjust the value of said fuel flow with respect to the datum. In a preferred form of the invention the first and second valve elements actually co-operate to define a metering flow orifice, each element being adjustable independently of the other, the one to adjust the orifice to a datum value and the other to vary said datum value; thus said valve elements are desirably formed by an independently adjustable sleeve and piston, the latter sliding within the former, and being slidable over a port in the sleeve wall which constitutes the metering orifice.

The means comparing and responding to a difference between the variable and standard frequencies may be an electric motor having fields in the stator and rotor respectively produced by the alternating current supplies to be compared, at least one of said fields rotating, the arrangement thus being such that the motor will be started only when these supplies depart from a predetermined frequency relationship, and will stop when that relationship is restored.

The invention has particular application to the all-speed governing of gas-turbine aero-engines and the secondary factor may be imported that two or more such engines may be synchronised and governed and controlled collectively; it may also look after various complicating matters which are encountered in connection with such engines, such as the varying density and temperature of the consumed air at various heights. The invention affords an "all-speed" control system, whereby the operator, simply by manipulating a single lever corresponding to the usual throttle lever, selects or adjusts engine speed and this speed will remain constant within small limits, until a re-selection or readjustment is made. It is convenient to disregard the speed range below a certain limit in which range no critical circumstances are likely to arise so that the phrase "all-speed" governing is not to be taken as applying necessarily to the whole available speed range but only to that part of the whole range in which the requirement for governing arises. A subsidiary object of the invention is to provide governing and controlling means in which failure in what are perhaps the more vulnerable parts of the device need not have serious significance since manual control will remain available.

With a system in accordance with the invention the propulsive thrust of an aircraft power plant will automatically vary with variations of airspeed in such a way as to stabilise the airspeed at a selected value. It can be envisaged that some degree of automatic speed control can be of considerable value in various circumstances of flight. For example, if an aircraft is under the control of an automatic pilot and especially where it is propelled by gas turbines, it may be desirable from the point of view of maximum economy or for other reasons closely to control the airspeed. It may also be desirable to control the airspeed where deliberate changes of flight path occur, for example if the pilot elects to climb or descend but wishes for other reasons to maintain a steady forward speed. Another case is that of the approach for landing in which the aircraft may be flown with only a relatively small safety margin of speed and it may be desired to ensure that in the event of the speed being inadvertently dropped engine power will immediately and automatically be increased to maintain safe speed. The invention enables these functions, and others which may be desirable, to be accomplished in a simple and effective manner.

A further feature of the invention is concerned with the provision of means for controlling the pitch of a propelling screw so that the angle of attack of the propeller blading tends to be maintained at its aerodynamically most efficient value. Thus, in further accordance with the invention the control system of the invention further comprises means adjusting the pitch of the blading in accordance with both the rotational speed of the screw and the relative speed of approach of the medium in which it operates.

In each of the cases described in the foregoing means are also preferably provided whereby the automatic function of the system may be overridden, for example by operating a manual speed controlling lever.

Other and more detailed features of the invention will appear from the following description with reference to the accompanying drawings in which Figure 1 illustrates in a purely diagrammatic manner, and by way of example only, an embodiment of the invention in which all three aspects thereof are combined, whilst Figure 2 illustrates a suitable form of valve for inclusion in the system illustrated in Figure 1. It will be appreciated that the precise form of the means for transmission of movement between parts of the system will be dictated entirely by the physical nature of the surroundings in which the system is to be installed, and it will be obvious, therefore, that there is wide scope for variation in the nature and design of such transmission. Thus no useful purpose would be served in illustrating a detailed design, and the mechanical linkages diagrammatically shown in Figure 1 are intended merely to symbolise in principle what is required.

In the drawing, in which it is supposed that the system is associated with an aircraft power plant so as to govern and control engine speed, air speed, and the angle of attack of propeller blading, the throttle device (see particularly Figure 2) comprises a body 1 of appropriate form having a generally cylindrical bore 2, radially ported at 3, in which bore is slidable a first controlling element, in the form of a substantially cylindrical sleeve 4 radially bored at 5 to receive into its interior from part 3, supply fuel under pressure and having at its end a series of axial notches or slots at 6 forming a graduated throttle opening. Slidable within this first element is a second controlling element which is in the nature of a piston 7 waisted at 8 opposite the radial bores and having a valve-like end 9 coacting with the graduated throttle opening 6 in such a way that relative axial movement between the first and second (outer and inner) elements 4, 7, results in greater or less throttle opening. The fuel flow is by way of ports 3, 5, 6, as indicated by the arrows. The inner element 7 is preferably connected by a compression spring 10 to a cam follower 11 likewise slidable in a bore in the body 1. The cam follower 11 is engaged by an eccentric or cam 12 mounted on a hand throttle spindle 13 borne in the body 1 and suitably glanded. The arrangement is such that after the spring 10 has been partially compressed the cam follower 11 bears positively on the second element 7, the spring compression being caused by the fuel pressure in the chamber formed around the waisted portion 8 of the element 7. The initial setting of the spring 10, and thus the idling speed of the engine, is determined by adjustment of an abutment element 14 having a threaded mounting in the cam follower 11 and externally accessible for setting and locking, whilst at speeds above idling the positive entraining of the second element 7 with the cam follower 11 ensues. The first element 4 is directly connected by an eccentric 15 with a governor throttle spindle 16 borne in the body similarly to the spindle 13. It follows that movement of either spindle 13 or 16 produces axial movement of its corresponding element 7 or 4 and consequently effects a change in the throttle opening. The throttle valve device above described is situated in a fuel line of the engine, so as to control the latter, and is capable of being operated both by hand or like means, and by any suitable relayed or direct governor action. It will be evident from the foregoing that the element 7—8—9 serves to define a datum value of the fuel flow with respect to which variations may be effected by adjustment of the element 4.

Positively coupled through reduction gearing indicated at 17 (see Figure 1) to the governor throttle spindle 16 is the rotor of an electric motor, represented by the single winding 18 which is fed from the output of a self-oscillating valve master oscillator and amplifier 19 of which the output frequency is controllable. The corresponding stator, indicated at 20, is wound for three-phase operation to produce a rotating field and is fed by a three-phase generator (not shown) positively driven by the engine, which generator may also supply other services since virtually only its frequency is important for the present purpose.

It will be appreciated that with the arrangement just described there will be no movement of the rotor 18 so long as the frequency supplied to the stator 20 (which of course varies with engine speed) is the same as the standard frequency supply from the oscillator-amplifier 19 to the rotor 18, but if there is a difference of frequency the rotor will turn to vary the throttle valve opening through the gearing 17, spindle 16, and element 4 and with respect to a datum value defined by the position of the element 7; the engine speed will thus be correspondingly varied to change the frequency of the supply to the stator 20 until equilibrium is restored, the engine and the generator driven thereby thus constituting a follow-up to the original adjustment.

The three phase winding may, of course, be the rotor instead of the stator, without affecting the principle of operation. Further, the standard frequency supply may be three phase to produce a second rotating field, though this is an unnecessary complication, since the arrangement already described produces the effect of two rotating fields in controlling the operation of the motor.

The system so far described makes no provision for varying the datum speed value; i. e. it is not an "all-speed" governor. To provide for this, it is necessary to be able to adjust the standard frequency output of the oscillator-amplifier 19 and also the position of the element 7 of the throttle valve. For this purpose, a hand throttle lever 21 is connected through spring or other suitable resilient means 22 with which is associated a dashpot 23, both to the hand throttle spindle 13 and to the frequency control 24 of the master oscillator, through suitable linkages indicated respectively at 25, 26. The object of the spring and dashpot in this control is to prevent excessively rapid changes in frequency. Coupled by a suitable linkage 27 to the mechanical throttle lever connection is a switch or multiple contactor control 28, the purpose of which is to cut out the operation of the electromotor, and this switch and its operating linkage are so located and adjusted that the electromotor is cut out when the throttle lever is in the range of movement in which governing is not requisite (being opened, for example, by a stop 27a when the lever 21 is set for a predetermined low speed range).

The operation is as follows:

Within the working range let it be supposed that the pilot "opens the throttle." This directly moves the second control member 7 so as to increase the throttle opening in the valve and it simultaneously increases the frequency of the master oscillator 19 and therefore the frequency in the rotor circuit 18 of the electromotor. The frequency comparison with the frequency of the stator supply causes rotation in one sense of direction of the electromotor rotor 18 which through its connection to the first controlling element 4 moves this in the same sense as the second element 7. Meanwhile the engine speed has been increasing so that the frequency of the supply to the stator 20 is increasing. When the frequency in the stator equals the frequency in the rotor the rotor comes to rest and the throttle opening now corresponds to the new speed which was in effect selected by the pilot when he moved his throttle lever. So long as the engine speed remains consistent with the frequency of the master oscillator the rotor will remain stationary, but any departure of engine speed from this condition will result in rotating of the rotor in appropriate sense to open or close the graduated throttle opening appropriately to bring the engine speed back to correspondence. The speed of the rotor and therefore of the rate at which the first control element is moved will be proportional to the difference of frequency in the stator and rotor.

The system so far described does not deal with variations of airspeed. In order to do so the system is modified by the introduction of an airspeed-responsive device which is used to modify the setting of the standard frequency effected by the throttle lever 21. In the proposed form illustrated, a pressure-responsive capsule 29 forms a support for the fulcrum of a part of the linkage 26 so as to modify the effective position of adjustment of the linkage in relation to the frequency control 24. The pressure in the capsule 29 is controlled by its connection at 30 to an airspeed indicator (not shown), which may be in the nature of a true airspeed indicator, i. e. one in which there is an automatic correction for variation in air density. The lever 21 now, of course, constitutes both a throttle control and a speed control; thus when the control lever 21 is moved forward to adjust the oscillator to increase the engine speed, the lever system 26 will operate to effect the speed change with its connection to capsule 29 acting as a fixed fulcrum. As the airspeed increases, however, the capsule will act to reduce the engine speed setting through the lever system 26 and oscillator 19 until the airspeed is reached for which the capsule is adjusted (clearly different airspeeds may be selected by varying the response of the capsule). Once the selected airspeed is attained, then a change of indicated-airspeed brought about, for example, by a change of altitude, changes the adjustment of the oscillator in the appropriate sense without moving the control lever. The arrangement is such that this adjustment of the oscillator will be of appropriate sense and magnitude to restore the aircraft to the required indicated airspeed by causing the appropriate change of engine speed and consequently thrust.

There may be circumstances in which the device is to be employed to achieve control of true airspeed, in which case of course the appropriate elaboration of the speed-sensitive means may be introduced. The speed-sensitive means may be caused to operate on the engine control system through servo-mechanism of, for example, electric or hydraulic type, though it is believed that in practice, if the function of the speed lever is simply to vary an electrical adjustment, its mechanical duty may be so light that the direct action of a Pitot operated capsule may suffice.

The drawing also illustrates the control of airscrew pitch to maintain the aerodynamically most efficient angle of attack of the airscrew blades. The normal method of controlling a variable pitch airscrew provides for varying the pitch in such a manner as to tend to maintain constant engine speed; that is, the power-absorption of the airscrew is varied to oppose a change of engine speed. This, however, does not result in maintaining the airscrew blades at their aerodynamically most efficient angle of attack, which depends not only upon the speed of rotation but also upon the approach velocity of the air (or the speed of travel of an aircraft). In the present system the latter factor is taken into account; thus, in the example illustrated, the airscrew 31 is of the fully feathering and reversible-pitch type operated by a reversible pitch changing motor 32. Driven by the engine positively is a compound wound generator 33 with a low resistance armature, such that the E. M. F. generated depends practically on the rotational speed. The pitch changing motor 32 is energised through reversible circuits 33'—34, 33'—35, including a three-position switch or contactor arranged as follows: an arcuate two-pole contact shoe 36 is provided in which there is a gap between the shoes forming a neutral position. This shoe is movable about an axis "X" by linkage 37 which transmits to the shoe mechanically, a motion corresponding to pitch changes of the airscrew blading and in this linkage is an element of variable length formed by oppositely threaded ends of a screw 38 engaging stationary nuts 39 offered by the linkage 37. This part of the device constitutes follow-up mechanism with an internal adjustment. Coacting with the contact shoe 36 is a contact arm or brush 40 mounted to rock on the axis "X" about which the shoe is movable for follow-up. The arm 40 extends from a structure comprising two coils 41, 42, disposed in planes at right angles and including the said axis, the coils lying between the two-pole shoes 43 of a permanent magnet. One of the coils is energized by inclusion in circuit 44, 45 with a fixed resistance from the generator 33 directly, whilst the other is in shunt through a circuit 46 containing a variable resistance 47, whose adjustment is effected by the response of a true airspeed indicator, for example by a pressure-sensitive capsule 48. When the two coils 41, 42 and their contact 40 are in neutral position contact is broken from the shoe 36, in the neutral gap. Partial rotation of the coil system in one sense makes contact between the arm 40 and the shoe 36 to complete the pitch motor circuit to change pitch in one sense, whilst opposite rotation of the coil system causes change of pitch in the other sense.

A manual override pitch control is provided in the form of a lever 49 connected by a mechanical linkage 50 having a lost motion connection 51 to the coil system, and the same linkage carries a switch 52 to break the generator circuit. Movement of the lever 49 to one extreme position breaks the generator circuit and simultaneously moves the contact arm 40 to its extreme position in one sense in which the pitch motor 32 fully feathers the airscrew 31; movement of the lever to the other extreme also breaks the generator circuit and moves the contact arm 40 positively to a position in which the pitch motor causes reversal of airscrew pitch. In either case the action of the follow-up linkage 37, 38, 39 is of course such as to stop the pitch motor when the desired extreme pitch condition is reached.

In order to provide for appropriate resetting of the airscrew pitch upon resetting of the engine speed the adjustable screw element 38 of the follow-up linkage 37 is connected through gearing 53 and linkage 54 to the engine and airspeed control linkage 26 already described, the arrangement being such that upon operation of the latter the screw 38 will be rotated to vary the spacing of its nuts 39, and thus the position of the shoe 36, thereby operating the pitch motor 32.

In order to allow minor adjustments to be effected by the airspeed-sensitive device without directly disturbing the follow-up linkage 37, the engine/airspeed linkage 26 is coupled to the oscillator frequency adjustor 24 without lost motion, whereas the linkage 54 has a lost motion connection at 55. The action of the capsule 29 following an engine speed change will always tend to restore the connection 55 to a neutral position. It will be appreciated, of course, that the element 38 and its associated gearing must be mounted so as to be bodily movable to perform its follow-up function without disturbing the lost motion connection at 55.

In operation it will be seen that the pitch of the airscrew is set in accordance with the fluctuations in engine speed and true airspeed by the joint operation of the circuits 44, 45, and 46, 45, and to this extent the pitch control is independent of the engine and airspeed control systems; however, due to the presence of the engine speed and airspeed control system, the pitch control system will be required to look after only those variations of engine speed arising from the adjustment of the capsule 29 or such latitude as is allowed by the throttle control system, whilst major adjustments of the pitch setting are effective through the linkage 54 acting upon the follow-up system.

Instead of using a normal airspeed indicator to influence the resistance 47, a similar effect, still giving an interpretation related to airspeed, may be obtained by the application of a yawmeter to the propeller. This consists essentially of means for determining the differential pressure between the two sides of the leading edge of a blade, and thus obtaining a measure of the displacement of the blade from its optimum angle of attack, in terms of pressure, which is transmitted to the capsule 48 as before. Such a device is, of course, not novel in itself and its adaptation to the present circumstances need not, therefore, be further elaborated.

I claim:

1. An aircraft speed control system, comprising means for supplying a first alternating electric current, means for varying the frequency of said current as a function of engine speed, a second current supply means for supplying alternating electric current of a standard frequency, means for selectively setting such standard frequency, means operable in response to a difference between said frequencies to effect an adjustment of engine speed in a sense that will adjust the frequency of said first current to equal the standard frequency, and airspeed-sensitive means for modifying the setting of said standard frequency in accordance with departure from a selected air speed.

2. An aircraft speed control system as claimed in claim 1, including operator-controlled means for selectively varying the standard frequency to produce a variation in engine speed, said operator-controlled means comprising a mechanical linkage the action of which is modified by said air speed-sensitive means to vary the effective frequency adjustment in accordance with air speed.

3. An aircraft control system as claimed in claim 1, said means for effecting adjustment of engine speed including a control for the engine's fuel supply, and also including a first fuel control valve element, means for selectively adjusting said element to determine a datum value of the fuel flow, a second adjustable control valve element, and means for adjusting said second element in response to the frequency difference referred to, said valve elements cooperating to adjust the value of said fuel flow with respect to the datum.

4. An aircraft control system as claimed in claim 1, said means for effecting adjustment of engine speed including a control for the engine's fuel supply, and also including a first fuel control valve element, means for selectively adjusting said element to determine a datum value of the fuel flow, a second adjustable control valve, element, and means for adjusting said second element in response to the frequency difference referred to, said valve elements cooperating to adjust the value of said fuel flow with respect to the datum, said first and second valve elements being arranged mutually to cooperate to define a metering flow orifice, each element being adjustable independently of the other, the one to adjust the orifice to a datum value and the other to vary said datum value.

5. An aircraft control system as claimed in claim 1, said means for effecting adjustment of engine speed including a control for the engine's fuel supply, and also including a first fuel control valve element, means for selectively adjusting said element to determine a datum value of the fuel flow, a second adjustable control valve element, and means for adjusting said second element in response to the frequency difference referred to, said valve elements cooperating to adjust the value of said fuel flow with respect to the datum, said valve elements being formed by a sleeve and piston, the latter sliding within the former, said sleeve having a port in its wall over which the piston is slidable to constitute a metering flow orifice, said adjusing means for said valve elements being independently operable, the one for the purpose of setting the orifice to a datum value, and the other for varying said orifice size from such datum value.

6. Aircraft speed control system as claimed in claim 1, further comprising means for adjusting the pitch of an airscrew in accordance with both the rotational speed of the screw and airspeed, and a coupling connecting said means and the frequency selecting means of the engine speed control, whereby resetting of airscrew pitch accompanies resetting of engine speed.

7. Aircraft speed control system as claimed in claim 1, further comprising means for adjusting the pitch of an airscrew in accordance with both the rotational speed of the screw and airspeed, and a coupling connecting said means and the frequency selecting means of the engine speed control, whereby resetting of airscrew pitch accompanies resetting of engine speed, a power unit by which the blade pitch adjustment is effected, a first movable element controlling said power unit in accordance with movement of said first movable element, electrical means for effecting movement of said element, said electrical means including means providing an electrical supply having a value functionally related to the rotational speed of the airscrew, means for modifying said value in accordance with airspeed, said electrical means moving said movable element in accordance with the resultant of said values, and a second movable element having a follow-up connection with the power unit operable to cause pitch adjustment to cease upon reaching a value corresponding to the resultant of said electrical supply values.

8. An aircraft speed control system as claimed in claim 25, and an airscrew blade pitch controlling arrangement for maintaining the blade pitch adjusted to a position bearing a predetermined relation to airspeed and airscrew rotational speed, comprising a generator driven at a speed functionally related to the rotational speed of the airscrew and generating an E. M. F. functionally related to said rotational speed, a pair of coils movable in a magnetic field and connected in parallel across the output of said generator, the circuit of one coil having a fixed resistance, a variable resistance in the circuit of the other coil, means for varying said variable resistance in accordance with airspeed, whereby the position of said coils is determined by the relation between airspeed and airscrew rotational speed, a power unit for effecting blade pitch adjustment, first and second movable and cooperating elements, the relative positions of which control operation and energization of said power unit, a connection for transmitting movement of said moving coils to said first movable element to vary the position of said element in accordance with airscrew rotational speed and air speed, a follow up connection between said second movable element and said power unit to move said second element to deenergize said power unit when the blade is in a pitch position corresponding to the relation existing between airspeed and airscrew rotational speed, and a coupling connecting said follow up connection and the frequency selecting means of the engine speed control, whereby resetting of airscrew pitch accompanies resetting of engine speed.

9. An airscrew blade pitch controlling arrangement for maintaining the blade pitch adjusted to a position bearing a predetermined relation to airspeed and airscrew rotational speed, comprising a generator driven at a speed functionally related to the rotational speed of the airscrew and generating an E. M. F. functionally related to said rotational speed, a pair of coils movable in a magnetic field and connected in parallel across the output of said generator, the circuit of one coil having a fixed resistance, a variable resistance in the circuit of the other coil, means for varying said variable resistance in accordance with airspeed, whereby the position of said coils is determined by the relation between airspeed and airscrew rotational speed, a power unit for effecting blade pitch adjustment, first and second movable and cooperating elements, the relative positions of which control operation and energization of said power unit, a connection for transmitting movement of said moving coils to said first movable element to vary the position of said element in accordance with airscrew rotational speed and airspeed, and a follow up connection between said second movable element and said power unit to move said second element to deenergize said power unit when the blade is in a pitch position corresponding to the relation existing between airspeed and airscrew rotational speed.

10. An airscrew blade pitch controlling arrangement according to claim 9 wherein said power unit has an electrical energizing circuit in which said first and second elements comprise a circuit making and breaking device.

11. An airscrew blade pitch controlling arrangement according to claim 9 wherein said power unit is a reversible electric motor having an electrical energizing circuit, said first and second elements being connected in said circuit to form a two way switch.

12. An airscrew blade pitch controlling arrangement according to claim 9 wherein said power unit is a reversible electric motor having an electrical energizing circuit including two reversing connections, said first element being an electrical contact connected in said circuit and said second element carrying a pair of spaced contact shoes each engageable by said first element and connected, respectively, to the two reversing connections of said power unit, whereby contact of said first element with one shoe causes operation of the power unit in one direction and contact with the other shoe causes operation of the power unit in the opposite direction.

HENRY FREDERICK TRELAWNEY ADAMS.

REFERENCES CITED

The following references are of record in the file of this patent:

UNITED STATES PATENTS

| Number | Name | Date |
|---|---|---|
| 1,418,131 | Curtiss | May 30, 1922 |
| 1,483,536 | Warren | Feb. 12, 1924 |
| 1,651,821 | Heath | Dec. 6, 1927 |
| 1,908,894 | Findley | May 16, 1933 |
| 2,066,819 | Berry | Jan. 5, 1937 |
| 2,160,194 | Bates | May 30, 1939 |
| 2,217,856 | Brady | Oct. 15, 1940 |
| 2,244,139 | Buckingham | June 3, 1941 |
| 2,246,516 | Herzog | June 24, 1941 |
| 2,261,145 | Dickey | Nov. 4, 1941 |
| 2,272,664 | Gropler | Feb. 10, 1942 |
| 2,302,042 | Martin | Nov. 17, 1942 |
| 2,322,303 | Martin | June 22, 1943 |
| 2,391,896 | Hanson | Jan. 1, 1946 |
| 2,399,685 | McCoy | May 7, 1946 |
| 2,408,451 | Sorensen | Oct. 1, 1946 |
| 2,425,651 | Stalker | Aug. 12, 1947 |
| 2,455,378 | McCoy | Dec. 7, 1948 |
| 2,499,376 | Ferrill | Mar. 7, 1950 |

OTHER REFERENCES

Serial No. 281,826, Stieglitz et al. (A. P. C.), published May 18, 1943.